(12) United States Patent
Verkaaik et al.

(10) Patent No.: US 11,507,263 B2
(45) Date of Patent: Nov. 22, 2022

(54) METHODS AND SYSTEMS FOR CONFIGURATION OF A TOUCH SCREEN OF A WHEELCHAIR ON THE BASIS OF THE USER'S DISEASE STATE

(71) Applicant: DYNAMIC CONTROLS, Christchurch (NZ)

(72) Inventors: Julian Verkaaik, Avon, OH (US); Chad Marshall, Christchurch (NZ)

(73) Assignee: DYNAMIC CONTROLS, Christchurch (NZ)

( * ) Notice: Subject to any disclaimer, the term of this patent is extended or adjusted under 35 U.S.C. 154(b) by 347 days.

(21) Appl. No.: 16/625,476

(22) PCT Filed: Jun. 25, 2018

(86) PCT No.: PCT/US2018/039314
§ 371 (c)(1),
(2) Date: Dec. 20, 2019

(87) PCT Pub. No.: WO2018/237390
PCT Pub. Date: Dec. 27, 2018

(65) Prior Publication Data
US 2021/0072886 A1 Mar. 11, 2021

Related U.S. Application Data

(60) Provisional application No. 62/524,019, filed on Jun. 23, 2017.

(51) Int. Cl.
*G06F 3/04847* (2022.01)
*A61G 5/04* (2013.01)
(Continued)

(52) U.S. Cl.
CPC .......... *G06F 3/04847* (2013.01); *A61G 5/04* (2013.01); *G06F 3/0486* (2013.01); *G06F 3/04883* (2013.01)

(58) Field of Classification Search
CPC ............... G06F 3/04847; G06F 3/0486; G06F 3/04883; G06F 3/048; A61G 5/04; A61G 2203/16
See application file for complete search history.

(56) References Cited

U.S. PATENT DOCUMENTS 9,292,202 B2 * 3/2016 Takahashi ............. G06F 3/0489
9,870,098 B1 * 1/2018 Barsness .............. H05K 999/99
(Continued)

FOREIGN PATENT DOCUMENTS

EP 2 796 993 A2 10/2014
WO 2015/038007 A1 3/2015

OTHER PUBLICATIONS

Creed et al, "Enhancing Multi-Touch Table Accessibility for Wheelchair Users," Computers & Accessibility, ACM, pp. 255-256 (Oct. 20, 2014).
(Continued)

*Primary Examiner* — Jeanette J Parker
(74) *Attorney, Agent, or Firm* — Merchant & Gould P.C.

(57) ABSTRACT

Exemplary systems and methods associated with generating a customized touch screen configuration for a user of a wheelchair based on the user's disease state. The systems and methods determine the user's ability using various assessments. Generating a customized touch screen configuration includes modifying various touch screen feature settings in accordance with the user's capabilities. These settings include various techniques to better recognize touch screen input gestures from users with disabilities.

17 Claims, 8 Drawing Sheets

(51) Int. Cl.
　　　*G06F 3/0486*　　　(2013.01)
　　　*G06F 3/04883*　　(2022.01)

(56) References Cited

U.S. PATENT DOCUMENTS

2013/0144458 A1　　6/2013　Doherty et al.
2015/0253975 A1*　9/2015　Pettigrew ................. A61G 5/04
　　　　　　　　　　　　　　　　　　　　　　　　　715/772
2016/0147310 A1*　5/2016　Pate .......................... G06F 3/044
　　　　　　　　　　　　　　　　　　　　　　　　　345/168
2016/0320935 A1*　11/2016　Shin ..................... G06F 3/0484
2018/0095588 A1*　4/2018　Klein ................... G06Q 20/204

OTHER PUBLICATIONS

International Preliminary Report on Patentability from PCT/US2018/039314 dated Dec. 24, 2019, 8 pages.
International Search Report and Written Opinion from PCT/US2018/039314 dated Sep. 13, 2018, 16 pages.

* cited by examiner

METHODS AND SYSTEMS FOR CONFIGURATION OF A TOUCH SCREEN OF A WHEELCHAIR ON THE BASIS OF THE USER'S DISEASE STATE

RELATED APPLICATIONS

This application is the U.S. national stage entry of International Application No. PCT/US2018/039314, filed Jun. 25, 2018, which claims priority to and the benefit of U.S. Provisional Patent Application Ser. No. 62/524,019, filed on Jun. 23, 2017, which is hereby incorporated by reference herein, in its entirety.

TECHNICAL FIELD

The present invention relates generally to methods and systems for configuring a user interface for use with a motorized wheelchair or other personal mobility platform where such an interface utilizes a touch screen input device that is adaptable to the physical and mental capacities of the user.

BACKGROUND OF THE INVENTION

Motorized wheelchairs and similar devices are commonly used to provide assistance to individuals with disabilities who have compromised mobility, an inability to stand for extended periods of time, difficulty balancing, and/or other physical infirmities. Early examples of such devices utilized electro-mechanical input devices such as joysticks and switches to provide user-control and configuration. While such electromechanical devices provided a workable user interface that was suitable for certain users, these fixed-function types of devices did not provide a user interface that was easily adapted to the needs of a particular user. For example, certain users may lack the voluntary muscle control required to reliably operate a joystick or a switch. In addition, the nature of electro-mechanical input devices limits their reconfigurability.

A touch pad may also be used to input desired speed and direction, as illustrated in U.S. Pat. No. 6,926,106, entitled Wheelchair having speed and direction control touchpad. However, the muscle control required to reliably operate a touch pad can be even more than what is required for the electromechanical devices, due to the sensitivity of the touch surface.

Touch screen interfaces may be easily adapted to prompt a user as to a particular function and those functions may be easily reconfigured without the necessity of moving or relabeling a collection of electro-mechanical devices. Unfortunately, touch screen input devices rely on a user performing functions such as tapping, pressing, and/or swiping across a particular place on the touch screen. Generally, these functions need a certain level of dexterity and preciseness in order to determine what function the user wishes to perform. As noted above, motorized wheelchairs are used by individuals with various disabilities, including impaired mobility, which often is accompanied by a loss of certain motor skills. These user characteristics could result in the user not having the dexterity and preciseness needed to interact with touch screen interfaces.

SUMMARY

According to one aspect of the present invention, an apparatus generates a customized touch screen configuration for a user of a wheelchair, including determining the user's ability, generating the customized touch screen configuration based on the user's ability, where the user's ability is associated with a disease state of the user, presenting a customized touch screen user interface to the user based on the customized touch screen configuration, and receiving user inputs via the customized touch screen user interface.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

DESCRIPTION

Figure 1:
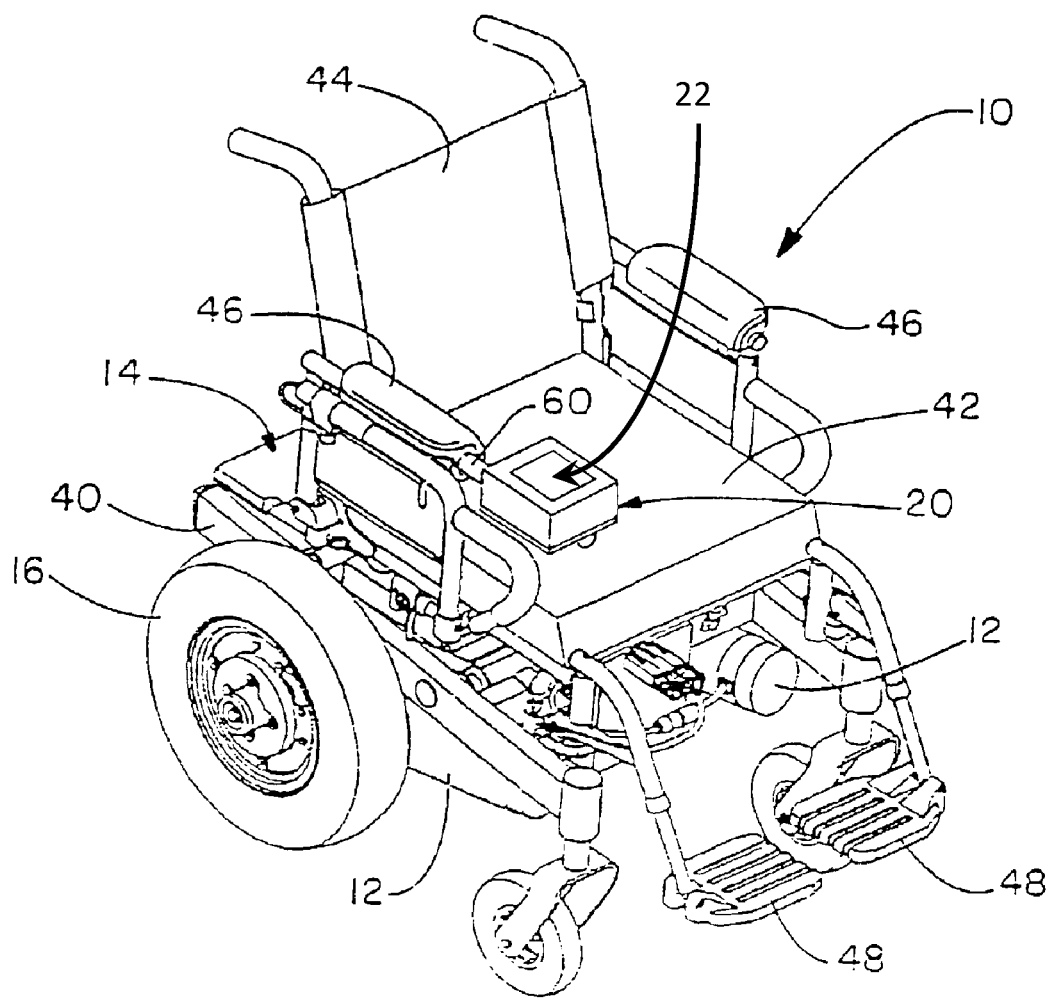
FIG. 1 is a perspective view of an embodiment of a powered wheelchair having a touch screen user interface.

The following includes definitions of exemplary terms used throughout the disclosure. Both singular and plural forms of all terms fall within each meaning:

"Circuit" or "circuitry," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or other programmed logic device. A circuit may also be fully embodied as software. As used herein, "circuit" is considered synonymous with "logic."

"Controller," as used herein includes, but is not limited to, any circuit or device that coordinates and controls the operation of one or more input or output devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software. As used herein, "logic" is considered synonymous with "circuit."

"Operative communication" or "circuit communication," as used herein includes, but is not limited to, a communicative relationship between devices, logic, or circuits, including mechanical and pneumatic relationships. Direct electrical, electromagnetic, and optical connections and indirect electrical, electromagnetic, and optical connections are examples of such communications. Linkages, gears, chains, push rods, cams, keys, attaching hardware, and other components facilitating mechanical connections are also examples of such communications. Pneumatic devices and interconnecting pneumatic tubing may also contribute to operative communications. Two devices are in operative communication if an action from one causes an effect in the other, regardless of whether the action is modified by some other device. For example, two devices separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) 802.11 and 802.15 communications links, xi) satellite communication links, xii) near-field communication, and xiii) other wireless communication links. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Processor," as used herein includes, but is not limited to, one or more of virtually any number of processor systems or stand-alone processors, such as microprocessors, microcontrollers, central processing units (CPUs), and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Signal," as used herein includes, but is not limited to, one or more electrical signals, including analog or digital signals, one or more computer instructions, a bit or bit stream, or the like.

"Software," as used herein includes, but is not limited to, one or more computer readable or executable instructions that cause a computer or other electronic device to perform functions, actions, or behave in a desired manner. The instructions may be embodied in various forms such as applications (apps), routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like.

While the above exemplary definitions have been provided, it is Applicant's intention that the broadest reasonable interpretation consistent with this specification be used for these and other terms.

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of conventional functions and constructions are omitted for clarity and conciseness.

Figure 2:
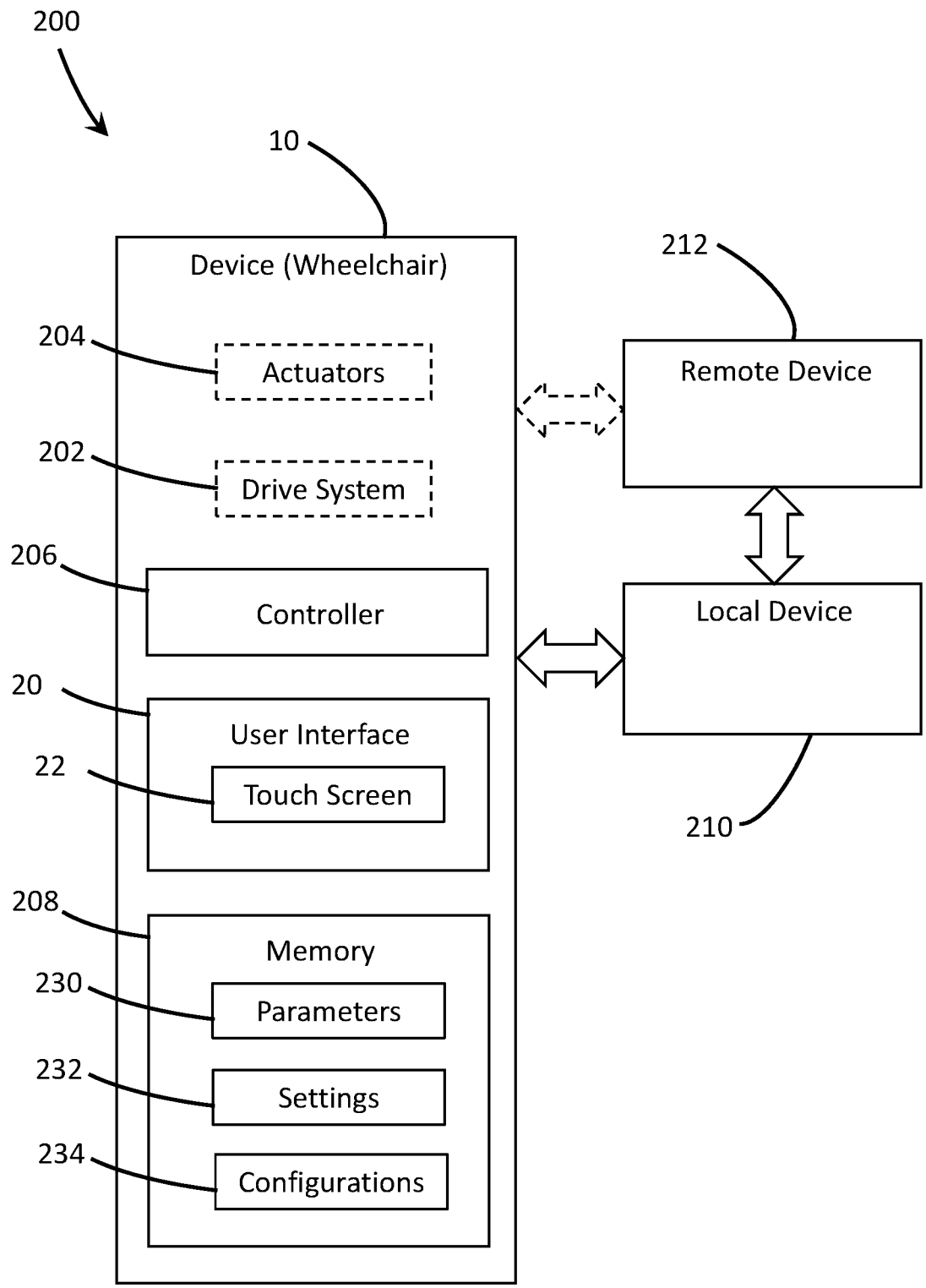
FIG. 2 is a block diagram of exemplary wheelchair components and associated devices.

FIG. 1 shows an exemplary powered wheelchair 10 and FIG. 2 shows a block diagram 200 of exemplary wheelchair 10 electronic components. FIG. 1 is an example of a wheelchair 10 which can employ a touch screen 22 as at least part of the wheelchair user interface 20. The wheelchair 10 can be powered by one or more batteries, D.C. current or any other alternative power source, which is capable of powering the touch screen 22 directly or indirectly (e.g., via a transformer, converter, etc.). An optional battery compartment 14 for housing one or more batteries can be seen in FIG. 1, but any other element can be used to locate the batteries on the wheelchair 10. Any type of motor or motors, generally shown as 12, can be employed to operably drive one or more wheels 16 of the wheelchair drive system 202, with further reference to FIG. 2. Examples of such motors commonly used in the art can be classified as D.C. gear motors, brushless gear motors, brushless gearless motors, etc. Different types of wheel drives, for example, front-wheel drive, mid-wheel-drive, rear-wheel drive, all-wheel drive, or four-wheel drive, can also be used. Moreover, with regard to power wheelchairs such as that shown in FIG. 1, different designs and embodiments, such as wheel sizes and locations can be utilized and the figure is merely an example of one type of wheelchair drive system.

Wheelchair 10 generally contains a frame 40 upon which a seat 42 can be mounted. The seat 42 has a seat back 44 and either or both can be stationary or have a fixed position, i.e. non- or minimally-adjustable. Tilt seats and/or seat backs, which may or may not maintain a constant center of gravity, can also be used. The seat 42 may be a reclining seat or both a tilting and reclining seat. The wheelchair 10 may have arms 46, footrest 48, and various other support surfaces. Any or all of these support surfaces 42, 44, 46, 48 may also be movable with associated power actuators 204, with further reference to FIG. 2.

Wheelchair 10 includes a user interface 20 with a touch screen 22. One or more housings may include the user interface 20, a wheelchair controller 206, wired and/or wireless interface devices, and/or other electronics. The controller 206 may include a processor and/or memory 208 for executing logic, including software, to execute the functions discussed herein. Memory 208 may be shared for various functions of the wheelchair 10, including those associated with the controller 206 and the user interface 20. In some embodiments, the controller 206 and user interface 20 may be combined into one device. Interface devices may be used to facilitate communication between the wheelchair 10 and local devices 210 (e.g., smart phones, portable storage media, tablets, computers, programmers, etc.) and/or remote devices 212 (e.g., smart phones, computers, servers, remote databases, monitoring systems or stations, etc.). Communications may be via any suitable wired or wireless protocol for operative communication, including, for example, serial/parallel cables, Bluetooth, IrDA, 802.11, 802.15, WLAN, WPA, WEP, Wi-Fi, wireless broadband standards, modems, the Internet, cellular, LAN, WAN, etc. The user interface 20 may also include other user inputs (e.g., joystick, switches, buttons, dials, mouse, keyboard, etc.), indicators (e.g., lights, LEDs, alarms, etc.), displays, LCDs, etc. A communication interface may include various devices suitable for any type of communication, including, for example, network connections (e.g., modem, LAN, WAN), wired (e.g., USB, Ethernet), wireless interfaces (as mentioned above), portable storage medium interfaces (e.g., flash drive ports (e.g., memory sticks, USB, multimedia, SD, compact flash)), etc., including for communication with remote devices and/or stations.

The user interface 20, including touch screen 22, is for presenting a display and for receiving user inputs that may be used to control speed and direction while driving the wheelchair 10, control movement of the user support surfaces, provide commands to the wheelchair controller 206, select and/or adjust various programmable parameters 230 and/or settings 232 associated with operation of the wheelchair 10 (including, for example, touch screen configurations 234), etc. The touch screen 22 may include various modifiable features with a variety of settings 232 suitable for different user capabilities, as discussed in detail below.

The wheelchair 10, local device 210, and/or remote device 212 can include a wired and/or wireless interface device to receive and transmit data (including, e.g., parameters 230, settings 232, and configurations 234). The local device 210 and/or remote device 212 may also include a processor, a memory, logic, a user interface (including inputs), communication interface, display, and/or any other feature that may be used to develop and/or communicate with the wheelchair 10. The wheelchair 10, local device 210, and/or remote device 212 can communicate data for storage, further access, processing, analysis, etc. In one embodiment, remote device 212 can be used to analyze data from the wheelchair 10. In other embodiments, parameters 230, settings 232, and configurations 234, profiles, updated algorithms/thresholds, new/revised logic, etc. can be communicated from the remote device 212 (including via a local device 210) to the wheelchair 10 for implementation. The devices 10, 210, 212 may communicate and store various configurations 234 as part of a library of disease-based configurations 234 accessible by all of the devices 10, 210, 212.

In various embodiments, the various components of system 200 may be separate components in operative communication with each other or may be integrated to various degrees. The degree of integration may range from discrete components sharing a common housing to full integration into one or more integrated components or devices with combined capabilities.

Touch screen 22 can comprise a touch or pressure sensitive surface on the device capable of producing signals in response to touch or pressure (and optionally in response to the amount of pressure). In some embodiments, the touch point may represent a point of contact along multiple axis directions in a field of two or more dimensions relative to the plane of the touch screen surface. For example, in a two-dimensional embodiment, an X axis (e.g., associated with side-to-side and/or left-and-right) and a Y axis (e.g., associated with forward-and-reverse and/or up-and-down) may be associated with the touch screen surface plane. In a three-dimensional embodiment, a Z axis (e.g., associated with magnitude) may be associated with the pressure applied to the touch screen surface. The touch screen 22 and the signals produced thereby may be used to control, select, and/or enter information into the wheelchair 10 as described above. In various embodiments, the touch screen 20 may be mounted and adapted for use with a finger, nose, chin, toe, other body part, and/or another suitable object such as a stylus/pointer (including pointers attached to an ambulatory or movable user body part), etc., as needed for a user to make contact or apply pressure to the sensor areas of the touch screen 22.

FIG. 1 shows an embodiment of the user interface 20 with touch screen 22 being operatively attached to mounting assembly 60. This is an exemplary method for mounting the touch screen 22 to the wheelchair 10 for use with a user's right hand or finger. Various other embodiments with different mounts may be used to adapt to the user's needs and capabilities. User interface 20 with touch screen 22 may also be used with other powered mobility assistance devices, including those with remote or local controllers where the interface device is equipped with a touch screen user interface. Other embodiments may comprise only the remote controller user interface device.

The touch screen 22 may be configured to enable the user to perform various input methods and functions, including tapping and/or swiping (including, for example, dragging and/or flinging), on the touch screen 22 surface. These input functions may be used for various controls and selections, including, for example, controlling the drive system 202 of the wheelchair 10, selecting and/or changing certain wheelchair functions or parameters 230/settings 232, configuring and/or selecting stored configurations 234 or user profiles, activating an audible alert device such as a horn or buzzer, activating lighting, moving or otherwise configuring actuators 204, selecting seating positions, selecting drive modes (e.g., saved as parameters 230), changing the potential speed of the assistance device, etc. The interaction mode or configuration 234 of the touch screen 22 can be initialized and/or modified by determining details of a wheelchair user's abilities, resulting in a customized configuration for the user. A touch screen configuration 234 may comprise one or more settings 232 associated with various features of the touch screen 22 adapted for the user's abilities. The various touch screen 22 features with modifiable settings 232 will be discussed in detail below. Since these configurations 234 and settings 232 may be stored in the memory 208 associated with the wheelchair 10 (including, for example, in the controller 206 or user interface 20), a plurality of configurations 234 may be stored according to the characteristics of the individual users that form the plurality of available configurations 234.

In one embodiment, a wheelchair 10 with a disease-based touch screen configuration 234 includes a controller 206 configured to control the wheelchair 10 in response to user inputs via a user interface 20. The wheelchair 10 includes a touch screen 22 for displaying information to the user and for receiving user inputs, wherein the touch screen 22 includes modifiable features that are set based on an ability assessment of the user associated with the user's disease state.

Generally, the touch screen 22 configuration 234 can be customized or tailored based on the user's abilities (which are associated with the user's disease state) and user's preferences. The user's abilities may be assessed using various sources of information and testing/characteristics, including, for example: International Classification of Function (ICF); motor control strength; motor control accuracy; level of touch sensation; level of spasticity; level of tremor; severity of Cerebral Palsy; Spinal Cord Injury (SCI) level; cognitive ability; and/or any other assessments or measures of user ability. The user's state or ability may be quantified in any manner that allows the system to determine or generate a setting 232 for a feature of the touch screen 22 suitable for the user's condition. Further refinements to settings 232 may be made in accordance with user preferences. Groups of touch screen 22 settings 232 may be saved as a configuration 234. In some embodiments, an initial touch screen configuration 234 may be determined based on the user's general disease state and further refined based on specific user abilities. In other embodiments, the configuration 234 may be modified based on updates or changes in the user's disease state and abilities.

Embodiments of the present invention utilize a user's ability assessment (including, for example, disease diagnosis and state) to identify particular needs or limitations of the user in regards to interacting with a user interface 20, including a touch screen 22. In one embodiment, a diagnosis or patient disease state may be received by the system to determine the capabilities of the user. The system may analyze the received diagnoses in order to apply settings 232 in the form of a configuration 234 to the touch screen 22 of the wheelchair user interface 20. Such configurations 234 may be required by characteristics likely present in the user as the result of the diagnosed disease state or condition. For example, disease states or conditions may result in a user's movements being restricted or the user may exhibit tremors such as those associated with a certain diagnosis like ALS.

Embodiments of the invention may apply settings 232 including: adapting touch screen boundary boxes to account for a user's conditions; adapting the pressure sensitivity of the touch screen interface; adapting the color scheme of the user interface to be more suitable for the user's vision levels; adaptation of the screen layout to a predetermined layout of graphical objects; selection of user interface options that comprise primarily drag/swipe operations or primarily tapping operations; adapting the virtual boundary box that distinguishes between valid and invalid drag movements; adapting the touch screen to distinguish between a drag and a fling movement by the user; reducing the level of complexity of the user interface, the icons used in the interface, or both; rotating the horizontal and vertical axes of the display; adjustments to increase or decrease the displayed size of user interface icons to suit a user's vision levels; adapt the displayed user interface from a right or left-handed configuration to match a user's capabilities; and any other touch screen features.

As noted above, touch screen 22 may be operated by pressing, tapping, and/or swiping operations/gestures performed on the surface of the touch screen 22. A quick and automatic optimization of the touch screen's settings 232 (e.g., input behavior, screen layout, appearance, etc.) based on a user's abilities and preferences will allow the user to better control the wheelchair 10. Based on an assessment of the user's abilities, modifications to the display and input characteristics of the touch screen 22 may enable a user with impaired functionality to more easily provide input commands to the controller 206 via the user interface 20. This customization capability based on user ability (e.g., based on assessments, rehab level, disease state, injury, feedback, etc.) streamlines the setup or configuration of a touch screen 22 for the user.

The capability to properly recognize the intended input of a user is critical to the use of any user interface, including a touch screen 22. Touch screens typically rely on various touch gestures from a user, including the pressing, tapping, and swiping operations mentioned above. Since users with different disease states have different abilities to execute these gestures, it is very beneficial to configure certain touch screen 22 features in accordance with any user's specific abilities, so that the user's intended input is properly recognized. This is important for user satisfaction and safety.

Figure 3:
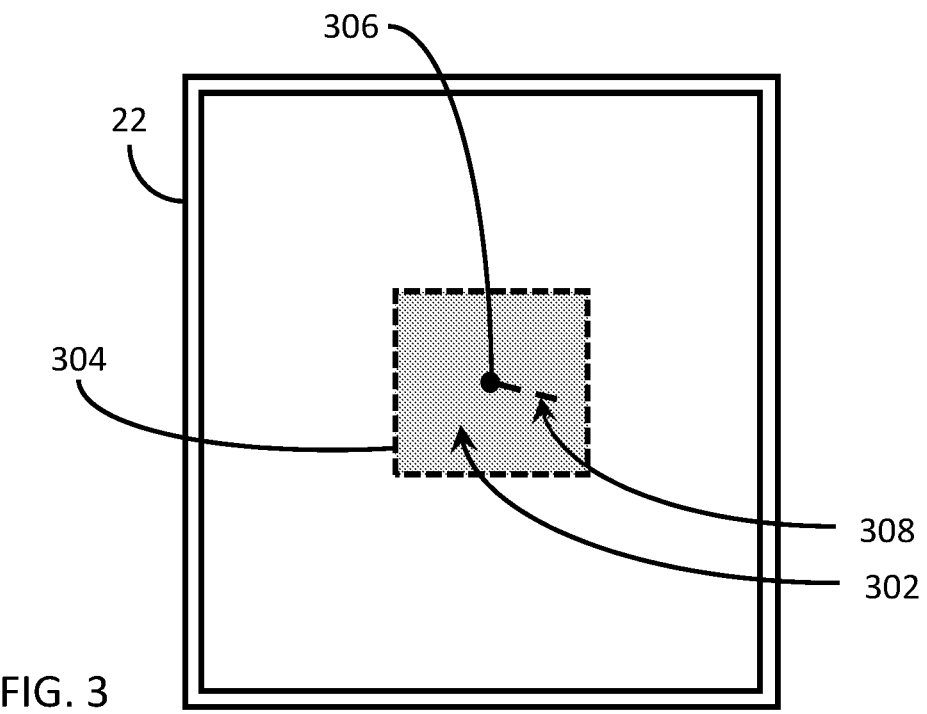
FIG. 3 shows an exemplary touch screen of a user interface with an exemplary boundary box for differentiating input gestures by the user and with an exemplary tap input.

Several of the modifiable features of the touch screen 22 involve a touch neutral zone defined by a boundary. FIG. 3 shows a touch screen 22 depicting an exemplary touch neutral zone 302 (shaded area) and exemplary touch boundary 304 feature. The boundary defines a virtual area (neutral zone 302) of the touch screen 22 that is used to differentiate input types based on whether a user's touch stays within or moves outside of the boundary. For example, a touch that stays within the boundary 304 will be defined as a tap input, whereas a touch that extends outside of the boundary 304 will be defined as a swipe input. A tap input and a swipe input are interpreted as different commands by the controller and can result in different actions or commands applied to what is displayed on the touch screen 22 in the touch area. A boundary 304 is utilized so that subtle or inadvertent movement of the user's touch during a tap will not be interpreted as a swipe. The boundary 304 is typically not displayed on the touch screen 22.

FIG. 3 depicts an exemplary square boundary box 304, but the boundary may be any suitable shape or size, including, for example, a circle, rectangle, etc. An initial touch point or the center of an image or icon displayed on the touch screen 22 may be used to define the center of the boundary box 304. Dashed line 308 depicts continued or subsequent touches on the touch screen 22 after the initial touch 306 at the center of the neutral zone 302. In the instance shown in FIG. 3, since the touch line 308 does not cross the boundary 304, the user's touch is interpreted as a tap input.

Figure 4:
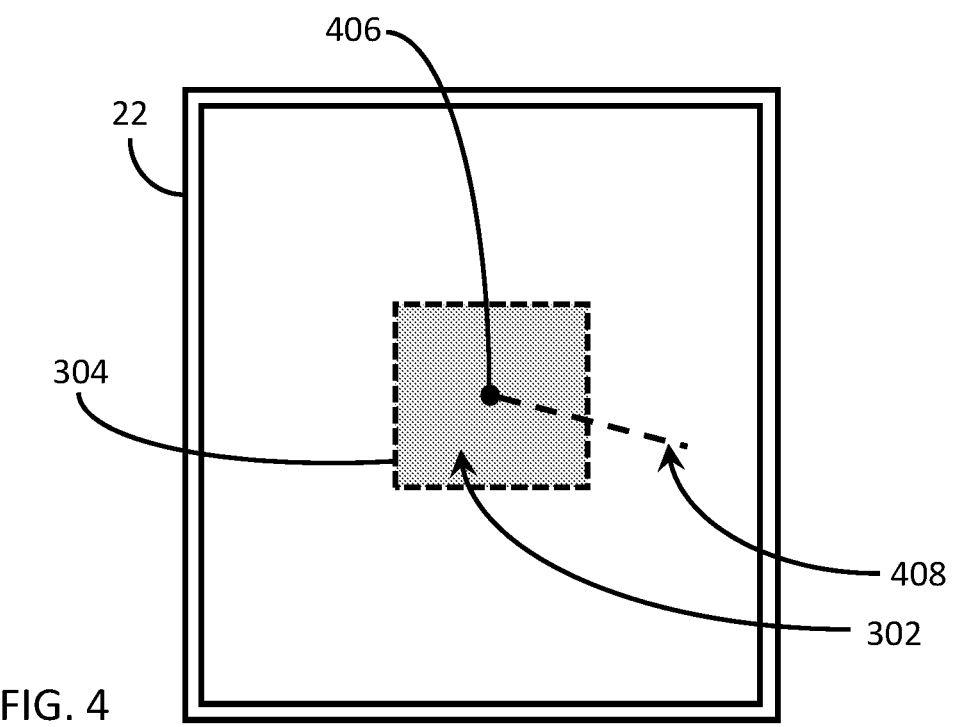
FIG. 4 shows another exemplary touch screen of a user interface with an exemplary boundary box for differentiating input gestures by the user and with an exemplary swipe input.

FIG. 4 shows a touch screen 22 depicting the exemplary touch boundary 304, but where a touch line 408 starts at center point 406 and does cross the boundary 304. In the instance shown in FIG. 4, since the touch line 406 does cross the boundary 304, the user's touch is interpreted as a swipe input.

The speed or acceleration of the touch gesture can also be utilized to determine the intended input. Swipes may include drags and flings, determined by speed or acceleration. For example: a tap input is defined by a touch and release within the neutral zone 302 (e.g., FIG. 3 path 308); a drag swipe is defined by a touch and move out of the neutral zone 302 and release with low speed movement (e.g., FIG. 4 path 408 at low speed); and a fling swipe is defined by a touch and move out of the neutral zone 302 and release with high speed movement (e.g., FIG. 4 path 408 at high speed).

The orientation or direction of swipes (including drags and flings) is also used to determine the intended input command. Vertical and horizontal axes may be defined on the touch screen 22 to define the direction of a swipe. These axes may be defined in conjunction with the touch neutral zone 302 defined by the boundary box 304. The orientation of a swipe gesture can depend on which side of the boundary box 304 the gesture exits the first time.

Figure 5:
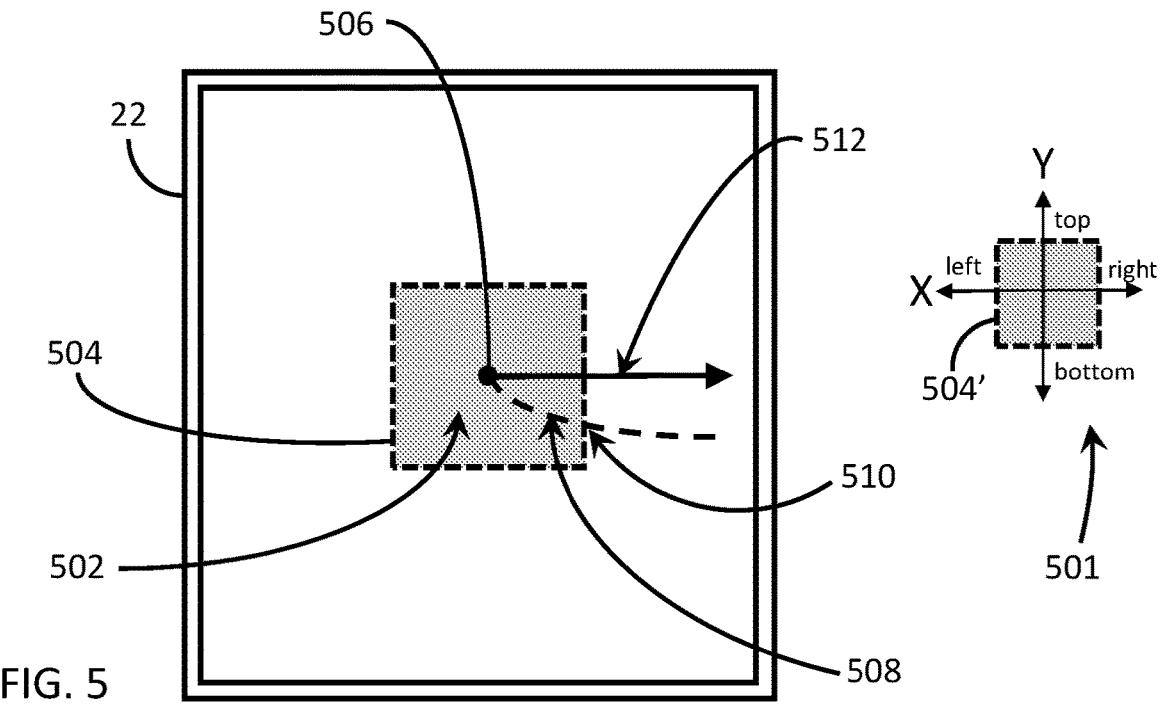
FIG. 5 shows an exemplary touch screen of a user interface with an exemplary boundary box for determining input gesture direction and with an exemplary swipe right input.

FIG. 5 shows a touch screen 22 depicting an exemplary touch neutral zone 502 (shaded area) defined by an exemplary touch boundary box 504 with four sides or edges. Exemplary reference axes 501 also define an X (e.g., horizontal) and a Y axis (e.g., vertical) for the touch screen 22 even though the axes 501 need not be shown on the touch screen 22. The reference axes 501 are oriented with the boundary box 504 such that swipes can be defined with a direction associated with each side of the boundary box 504.

To demonstrate, with reference to the virtual boundary box 504' superimposed on the axes 501: a swipe through the top of the boundary box 504' would be interpreted in the +Y direction (e.g., up); a swipe through the bottom of the boundary box 504' would be interpreted in the −Y direction (e.g., down); a swipe through the right of the boundary box 504' would be interpreted in the +X direction (e.g., right); and a swipe through the left of the boundary box 504' would be interpreted in the −X direction (e.g., left). Each of these inputs (e.g., up, down, right, left) can be associated with different commands to the controller 206.

For example, in FIG. 5, exemplary dashed line 508 depicts continued or subsequent touches on the touch screen 22 beyond the boundary 504 after the initial touch 506, which defines the touch as a swipe. Furthermore, since the touch line 508 crosses the boundary through the right side of the boundary box 504 at crossing point 510, the swipe is interpreted in the +X direction, shown as a swipe right 512.

Figure 6:
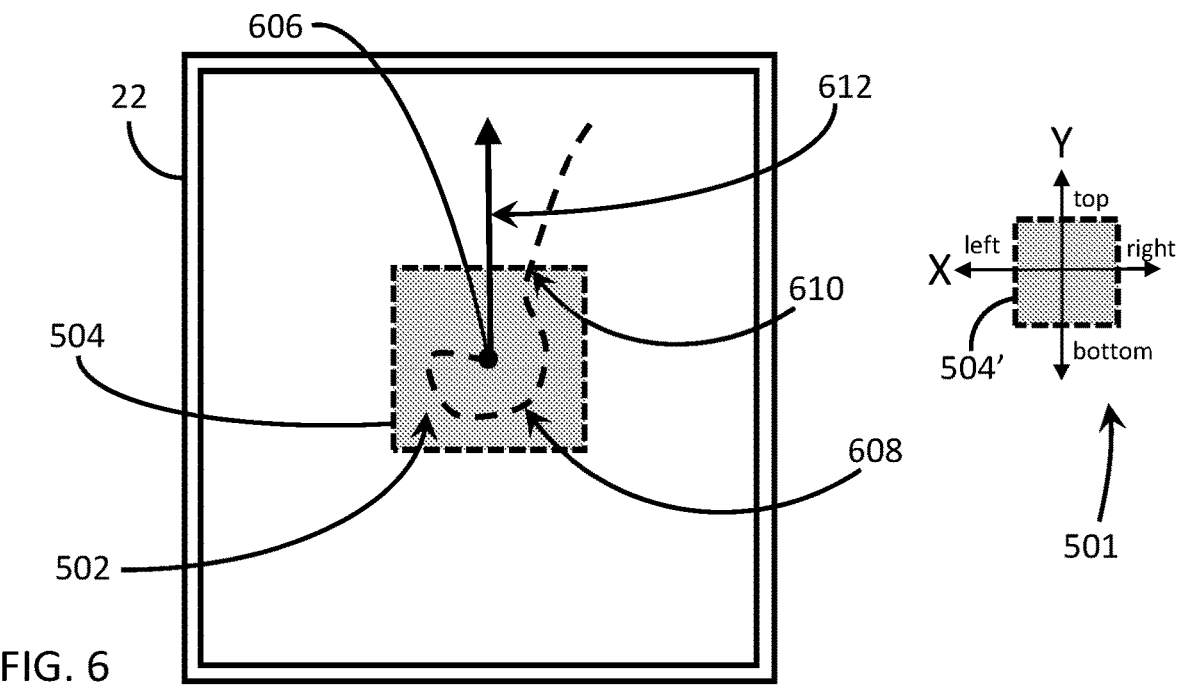
FIG. 6 shows another exemplary touch screen of a user interface with an exemplary boundary box for determining input gesture direction and with an exemplary swipe up input.

In another example, in FIG. 6, exemplary dashed line 608 depicts continued or subsequent touches on the touch screen 22 beyond the boundary 504 after the initial touch 606, which defines the touch as a swipe. Furthermore, since the touch line 608 crosses the boundary through the top side of the boundary box 604 at crossing point 610, the swipe is interpreted in the +Y direction, shown as a swipe up 612. This example highlights that touch motion within the boundary box 504 does not have an impact on the ultimate swipe direction, which is determined only by the side of the boundary box 504 (top, bottom, right, or left) crossed at the crossing point (e.g., crossing point 610 defines swipe up 612 independent of motion in other directions along touch line 608 before crossing point 610). Motion within the boundary box 504 that is in directions different than (e.g., left) and even opposite (e.g., down) relative to the ultimate swipe direction (e.g., swipe up 612) has no impact on the swipe direction determination. Even the primary direction of the touch line at the time of crossing the boundary is irrelevant. For example, if the touch motion is primary left or right (and slightly up) as it crosses the top side of the boundary box, the touch gesture would still be consider a swipe up.

Figure 7:
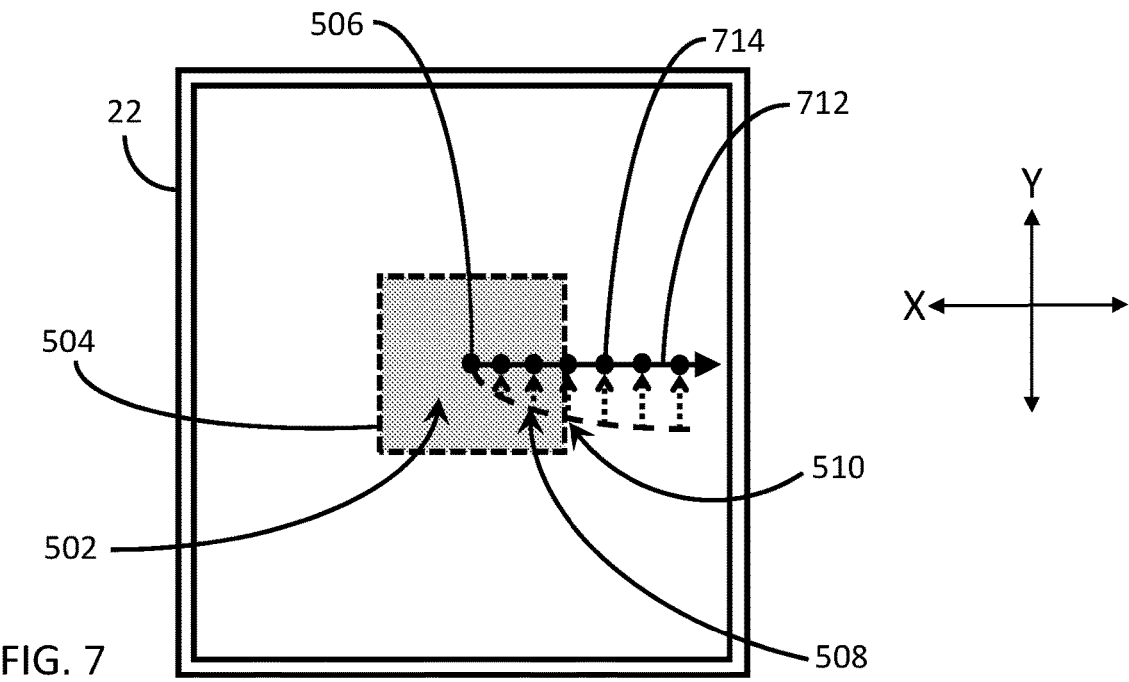
FIG. 7 shows an exemplary touch screen of a user interface with an exemplary boundary box and with an exemplary projection vector for a swipe right input.

Once the direction or orientation of the swipe gesture is determined, the gesture points can be projected along the axis of the swipe gesture. For example, using exemplary touch line 508 from FIG. 5, exemplary projections of the touch points from touch line 508 are shown in FIG. 7 along an X axis. In particular, because touch line 508 is interpreted as a horizontal swipe right on the X axis, all gesture points will be projected onto a horizontal axis 712 representing the swipe direction on either side of the starting point 506 (projections shown as dotted arrows) as projected points 714.

The relative spacing of the projected points 714 can be used to determine a speed and/or acceleration of the swipe gesture. Depending on the speed or acceleration of the swipe, each of the swipes can be further defined as a drag or a fling.

A fling swipe is a fast swipe action that can trigger a certain action (e.g. input, selection, function change, etc.) if the speed or acceleration of the swipe gesture exceeds a specified threshold. The speed and/or acceleration of the gesture will be measured using the end segment(s) of the projected points of the gesture. Speed and acceleration thresholds can be set as parameters or settings.

A drag swipe is a slow swipe action that can trigger a certain action (e.g. input, selection, function change, etc.) if the speed or acceleration of the swipe gesture does not exceed a specified threshold. In some embodiments, a drag swipe can be triggered once the latest touch point of the gesture goes beyond a specified location threshold. In these embodiments, the direction of the swipe can be determined by which location threshold triggered the drag swipe. The location/position threshold can be set as a parameter or setting.

Figure 8:
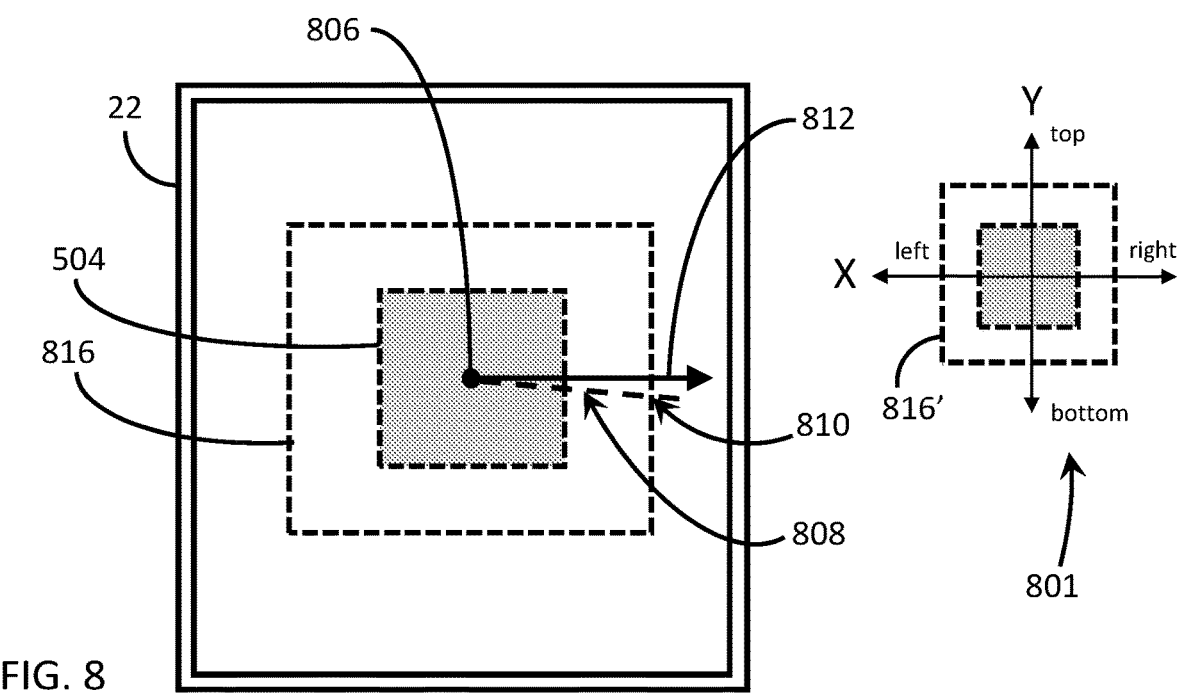
FIG. 8 shows an exemplary touch screen of a user interface with an exemplary boundary box and with an exemplary threshold box for determining a drag input.

For example, FIG. 8 shows a touch screen 22 depicting an exemplary touch neutral zone defined by an exemplary touch boundary box 504. Exemplary reference axes 801 also define an X (e.g., horizontal) and a Y axis (e.g., vertical) for the touch screen 22 even though the axes 801 are not shown on the touch screen 22. Exemplary drag thresholds are also depicted by threshold box 816, which has top, bottom, right, and left edges, similar to those of boundary box 504 as described above. The reference axes 801 are oriented with the threshold box 816 such that drag swipes can be defined with a direction based on which edge of the threshold box 816 is crossed.

To demonstrate, with reference to the virtual threshold box 816' superimposed on the axes 801: a swipe through the top of the threshold box 816' would be interpreted in the +Y direction (e.g., drag up); a swipe through the bottom of the threshold box 816' would be interpreted in the −Y direction (e.g., drag down); a swipe through the right of the threshold box 816' would be interpreted in the +X direction (e.g., drag right); and a swipe through the left of the threshold box 816' would be interpreted in the −X direction (e.g., drag left). Each of these inputs (e.g., up, down, right, left) can be associated with different commands to the controller 206. Thresholds 816 are not limited to boxes and may also be defined by one or more lines or other shapes.

For example, in FIG. 8, dashed line 808 depicts continued or subsequent touches on the touch screen 22 beyond the boundary 504 and beyond the threshold 816 after the initial touch 806, which defines the touch as a drag swipe. Furthermore, since the touch line 808 crosses the threshold through the right side of the threshold box 816 at crossing point 810, the drag is interpreted in the +X direction, shown as a drag right 812. Boundary 504 is an optional feature in this embodiment.

In this manner, by determining and defining the direction (up, down, right, or left) and the speed/acceleration (low or high), many different swipe input types can be defined: drag up, drag down, drag right, drag left, fling up, fling down, fling right, and fling left.

Examples of various modifiable touch screen user interface 22 features and associated settings 232 suitable for various disease states and user abilities are described in greater detail below. One or more settings 232 may be associated with a configuration 234 and a plurality of configurations may be available. The selection or modification of a setting 232 or a configuration 234 may be automatic based on the assessment of the user's abilities and/or disease state or may be selected or modified via user selection of a particular setting based on the user's preference. Settings 232 and configurations 234 may be stored, including as profiles.

Figure 9:
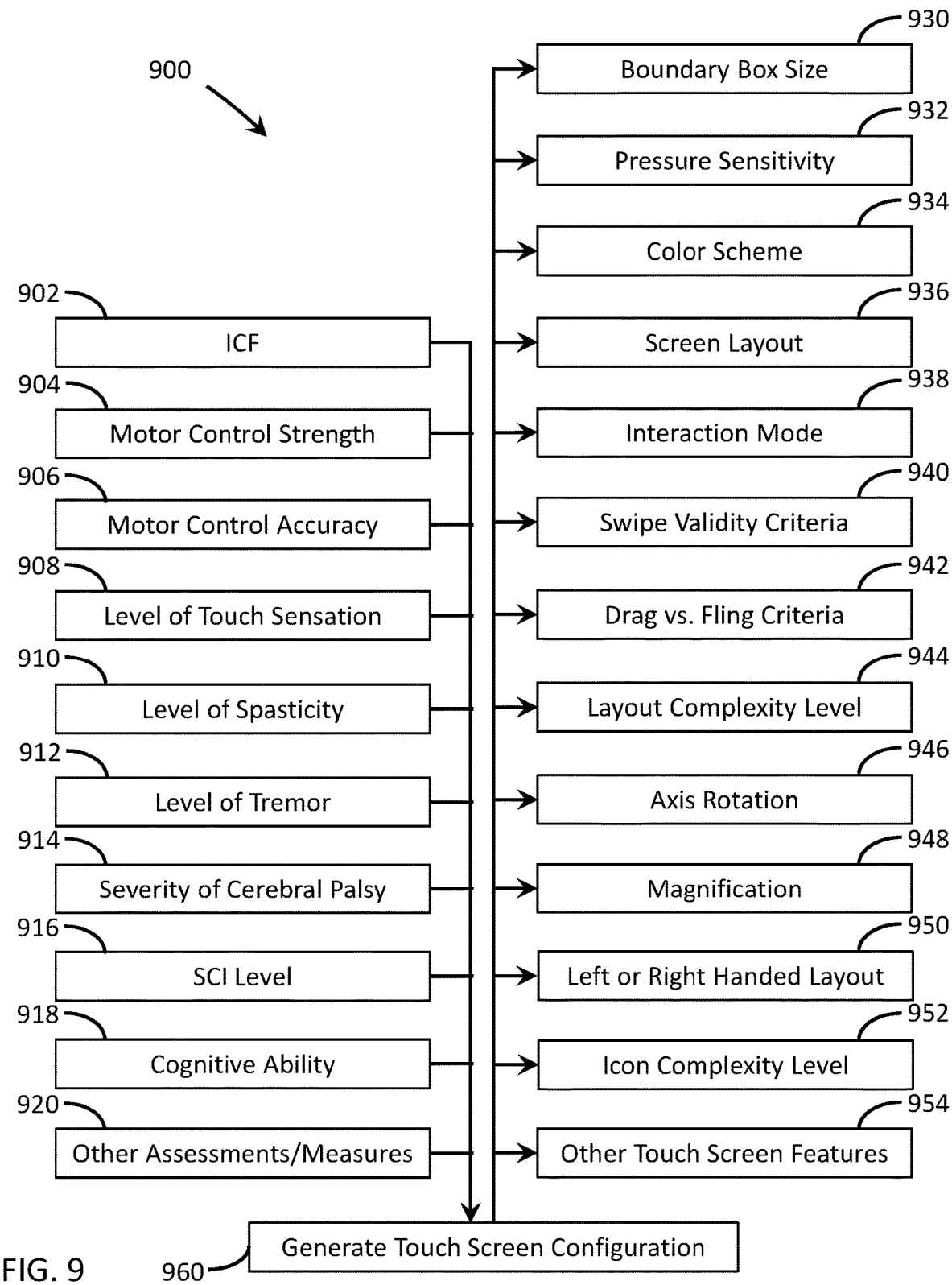
FIG. 9 is a block diagram of exemplary logic (inputs and outputs) for generating a customized touch screen configuration.

With reference to FIG. 9, the user's abilities may be assessed using various sources of information and/or testing/characteristics, including, for example: the International Classification of Function (ICF) 902; motor control strength 904; motor control accuracy 906; level of touch sensation 908; level of spasticity 910; level of tremor 912; severity of Cerebral Palsy 914; Spinal Cord Injury (SCI) level 916; cognitive ability 918; and/or any other assessments or measures of user ability 920. The user's ability or disease state may be quantified in any manner that allows the system to determine or generate a setting 232 for a modifiable feature of the touch screen 22 suitable for the user's condition. Such settings 232 and configurations 234 may be for specific users or may be settings 232 and configurations 234 that are assigned to various user characteristics categories or disease states. In some embodiments, the controller 206 may be placed into a "learning" mode. In the learning mode, a user may be prompted to perform certain actions, including inputs such as, for example, tap, swipe left, then right, then up, then down, etc. The controller 206 may receive these inputs and use them to learn the input pattern and interpret the signal specifically to this pattern.

With further reference to FIG. 9, modifiable touch screen features include: boundary box size (and shape) 930; pressure sensitivity 932; color scheme 934; screen layout 936; interaction mode 938; swipe validity criteria 940; drag versus fling criteria 942; layout complexity level 944; axis rotation 946; magnification 948; left or right-handed layout 950; icon complexity level 952; and any other touch screen features 954. The settings 232 for these features of the touch screen 22 can be based on one or more of the ability assessments of the user (associated with the user's disease state) and may be generated in any manner that results in settings 232 and/or a configuration 234 suitable for the user's condition (abilities). Various algorithms and/or rules may utilize one or more ability assessments to generate one or more settings 232.

Adjusting the boundary box size (and/or shape) 930 that distinguishes between a tap gesture and a swipe gesture (e.g., boundary box 304, 504 described above) is a touch screen 22 feature that may be modified. Ordinarily, a boundary box may be relatively small in area as a fully functioning user would touch a specific area of the touch screen and remain in contact with that area for a certain period of time. For example, a virtual pushbutton may be displayed on the touch screen. To operate the push button, a user may press on the screen as if the button were an actual electromechanical switch. If a user were to make contact with an area of the touch screen and then slide or drag their finger across the screen, the area of touch would move outside of the ordinary boundary box and be interpreted as a sliding or swiping input function. For example, a slide control may be used to control the brightness of a lamp or other display. On an ordinary touch screen, this is detected by a observing that the user's touch moves outside of a virtual boundary box located superimposed on a portion of the touch screen. In an embodiment of the invention, the boundary box size 930 may be adjusted such that it may allow a user to move their point of touch beyond an ordinary boundary box without the touch being interpreted as a sliding or swiping gesture. This adjustment is important for users with involuntary movements (e.g. tremors) and/or limited fine motor control (e.g. quadriplegic user). For example someone with low motor strength might require a small boundary box between a tap and swipe gesture. Someone with high muscle strength but low muscle control accuracy might need a large boundary box. (See, e.g., Table 1 below). Because of the different levels of user capability and muscle control, the boundary box size 930 may be adjusted so as to accommodate the needs of various users with different disease states. Boundary box size 930 settings 232 and configurations 234 may be accessed and/or stored, including as profiles, and may be specific to users or assigned to various user characteristics categories, such as, but not limited to, tremors, high or low muscle strength, and/or other such conditions or disease states.

Pressure sensitivity 932 of the touch screen 22 to suit the ability of the user is another touch screen 22 feature that may be modified. The capability to select higher or lower levels of pressure sensitivity 932 may be beneficial for users with muscle power impairment (e.g. quadriplegic users), voluntary muscle control impairment, and/or for users with pain (e.g. pain in upper limb). For example, a user with high sensitivity to pain from touch may have the sensitivity of a touch screen configured to be very sensitive. Another user with low muscle power could have touch screen pressure sensitivity 932 to be set to a high level of sensitivity in order to permit that user to more easily provide inputs to the touch screen 22. Alternatively, users with normal muscle control and pain sensitivity would have a more normal touch screen sensitivity 932. Pressure sensitivity 932 settings 232 and configurations 234 may be accessed and/or stored, including as profiles, and may be specific to a user or applicable to groups of individuals or user characteristics categories.

The selection of one or more color schemes 934 that are more suitable for the visual capability of the user is another touch screen 22 feature that may be modified. Such settings may be beneficial for users with visual acuity or vision quality impairment (e.g. color blindness, contrast sensitivity). For example, a user who experiences extreme color blindness may have a touch screen 22 display that is configured to only show colors that may be clearly distinguished by the user. Users with normal vision would not be as restricted in color schemes 934. Color scheme 934 settings 232 and configurations 234 may be accessed and/or stored, including as profiles, and may be specific to a user or applicable to groups of individuals who experience vision quality deficiencies.

The selection of one or more predetermined screen layouts 936 of graphical objects that suit the capability/preference of the user is another touch screen 22 feature that may be modified. The determination of a screen layout 936 may be important for users with vision quality impairments (e.g. cataracts), voluntary muscle control impairment, and/or muscle power impairment (e.g. quadriplegic user). For example, users with vision quality impairments may require that screen objects be larger and more distinct. Alternatively, users with muscle control impairment may require that input controls be positioned such that they are spaced farther apart than those intended for a user with better muscle control to prevent the impaired user from inadvertently selecting the wrong control. In another embodiment, users that have difficulty reaching the top of the touch screen 22 may have a screen layout 936 with extra control objects at the bottom of the touch screen 22 or vice versa. Screen layout 936 settings 232 and configurations 234 may be accessed and/or stored, including as profiles, and may be specific to a user or applicable to groups of individuals or user characteristics categories.

The selection of whether the main touch interaction mode 938 is tapping and/or swiping is another touch screen 22 feature that may be modified. This selection may be beneficial for users with voluntary muscle control impairment, muscle power impairment, and/or coordination of voluntary muscle impairment. For example, a user with low muscle control accuracy might have "tap" interaction preconfigured automatically. Alternatively, a user with high muscle tone and accuracy may have "swipe" interaction pre-configured to suit their more advanced capability. Interaction mode 938 settings 232 and configurations 234 may be accessed and/or stored, including as profiles, and may be specific to a user or applicable to groups of individuals or user characteristics categories.

The selection of swipe validity criteria 940 is another touch screen 22 feature that may be modified. The swipe validity criteria 940 may be a refinement of the size or shape of the boundary box that distinguishes between valid and invalid swipe movements and/or thresholds, as described above with reference to FIG. 8. For example, an initial boundary box may narrowly outline a displayed control that a user may "drag" across the touch screen 22 to perform a function (e.g., a volume control that is displayed as a slide control). In an embodiment configured for a user with lower levels of muscle control, the boundary box may be enlarged along the path of the displayed control in order to accommodate the path of user contact, which may likely be more erratic than that of a user with ordinary muscle control. A threshold may also be used to validate the swipe gesture. Such an embodiment may be beneficial for users with voluntary muscle control impairment, muscle power impairment, coordination of voluntary muscle impairment and/or involuntary movements (e.g., tremors). See Table 1 for examples. Swipe validity criteria 940 settings 232 and configurations 234 may be accessed and/or stored, including as profiles, and may be specific to a user or applicable to groups of individuals or user characteristics categories.

The selection of drag versus fling criteria 942 is another touch screen 22 feature that may be modified. Acceleration thresholds may be used to distinguish between a drag and a fling (or flick) gesture movement. An acceleration threshold of a touch point at the end of a swipe may be set to a high acceleration threshold for users with tremors or a low threshold for users with low muscle tone. Such settings may be useful to more accurately distinguish between a drag input motion and a fling input motion for users with voluntary muscle control impairment, muscle power impairment, coordination of voluntary muscle impairment, and/or involuntary movements (e.g. tremors). Drag versus fling criteria 942 settings 232 and configurations 234 may be accessed and/or stored, including as profiles, and may be specific to a user or applicable to groups of individuals or user characteristics categories.

The layout complexity level 944 is another touch screen 22 feature that may be modified. For example, certain users may experience psychomotor control impairment, attention impairment, memory impairment, and/or visual perceptual impairment. In such circumstances, the touch screen 22 display may be set to present a simpler and less complicated interface for users with low cognitive ability. Alternatively, users with normal cognitive ability may select configurations that are more detailed and provide additional functionality and control. Layout complexity level 944 settings 232 and configurations 234 may be accessed and/or stored, including as profiles, and may be specific to a user or applicable to groups of individuals or user characteristics categories.

Axis rotation 946 is another touch screen 22 feature that may be modified. Axis rotation 946 is a setting that can rotate the horizontal and vertical axes used for detecting swipe input gestures. Such configurations may adapt the user interface to be more suitable to a user's ability to move a touch point across the user interface screen. This setting may be beneficial for users with voluntary muscle control impairment, muscle power impairment, coordination of voluntary muscle impairment, and/or involuntary movements (e.g. tremors). In the learning mode, the user may be prompted to swipe left, then right, then up, then down. The controller can receive these inputs and use them to learn the input pattern and interpret the signal specifically to this pattern. In other words, in such an embodiment, if a user is asked to swipe a certain direction and that direction varies from what would ordinarily be expected from a user in response to a particular prompt, the remote controller may be configured to interpret similar user responses as equivalent to a swipe in the certain direction requested by the remote controller in the learning mode, which may involve a modified axis orientation. Axis rotation 946 settings 232 and configurations 234 may be accessed and/or stored, including as profiles, and may be specific to a user or applicable to groups of individuals or user characteristics categories.

Magnification 948 is another touch screen 22 feature that may be modified. The magnification 948 can increase the display size of icons to match a user's vision levels. In such embodiments, the touch screen 22 may be automatically configured to use icons and buttons that are sufficiently large for the user's level of vision. Such an increase in displayed size may be beneficial for users with visual acuity or vision quality impairment (e.g. contrast sensitivity). Magnification 948 settings 232 and configurations 234 may be accessed and/or stored, including as profiles, and may be specific to a user or applicable to groups of individuals or user characteristics categories.

Displaying a left-handed or a right-handed screen layout 950 is another touch screen 22 feature that may be modified. For example, the speed control could be displayed on one side of the user interface for left-handed users and on the other for right-handed users. This capability may be important for user preference, users with voluntary muscle control impairment, muscle power impairment, and/or coordination of voluntary muscle impairment. Left-handed or right-handed screen layout 950 settings 232 and configurations 234 may be accessed and/or stored, including as profiles, and may be specific to a user or applicable to groups of individuals or user characteristics categories.

Similarly to the complexity of the overall user interface, the icon complexity level 952 is another touch screen 22 feature that may be modified. The touch screen 22 may be adapted to suit the user's ability to distinguish between icons (e.g., displayed icons may be limited to plain squares/circles/triangles/etc. for children). Adjusting the complexity of the displaced icons may be important for users with visual acuity, vision quality impairment (e.g. color blindness, contrast sensitivity), visual perceptual impairment, and/or reception of written language impairments. Icon complexity level 952 settings 232 and configurations 234 may be accessed and/or stored, including as profiles, and may be specific to a user or applicable to groups of individuals or user characteristics categories.

FIG. 9 is a block diagram 900 showing various sources of information and testing/characteristics used to generate a touch screen configuration 960, including settings 232 for various modifiable features described above. As mentioned above, the settings 232 for these modifiable features of the touch screen 22 can be based on one or more of the ability assessments of the user and may be generated in any manner that results in settings 232 and/or a configuration 234 suitable for the user's abilities, including via use of various algorithms and/or rules to generate the settings 232. For example, Table 1 shows how two modifiable features, interaction mode 938 and boundary box size 930, can be set based on motor control strength 904 (or muscle tone) and motor control accuracy 906.

TABLE 1

Muscle Tone and Control vs. Interaction Mode and Boundary Box Size

|  | Low Tone | Medium Tone | High Tone |
| --- | --- | --- | --- |
| High Accuracy | Interaction Mode: Swipe Boundary Box Size: Small | Interaction Mode: Swipe Boundary Box Size: Small | N/A |
| Moderate Accuracy | Interaction Mode: Swipe Boundary Box Size: Medium | Interaction Mode: Swipe Boundary Box Size: Medium | Interaction Mode: Tap Boundary Box Size: Medium |
| Low Accuracy | Interaction Mode: Tap Boundary Box Size: Small | Interaction Mode: Tap Boundary Box Size: Medium | Interaction Mode: Tap Boundary Box Size: Large |

Similar rules and algorithms may be used to generate various settings 232 based on any number of user assessments. Settings 232 may also be grouped for various diseases and states. For example, an assessment of the severity of cerebral palsy 914 of a user can be used to generate a group of settings for various modifiable features automatically based on the same assessment.

Figure 10:
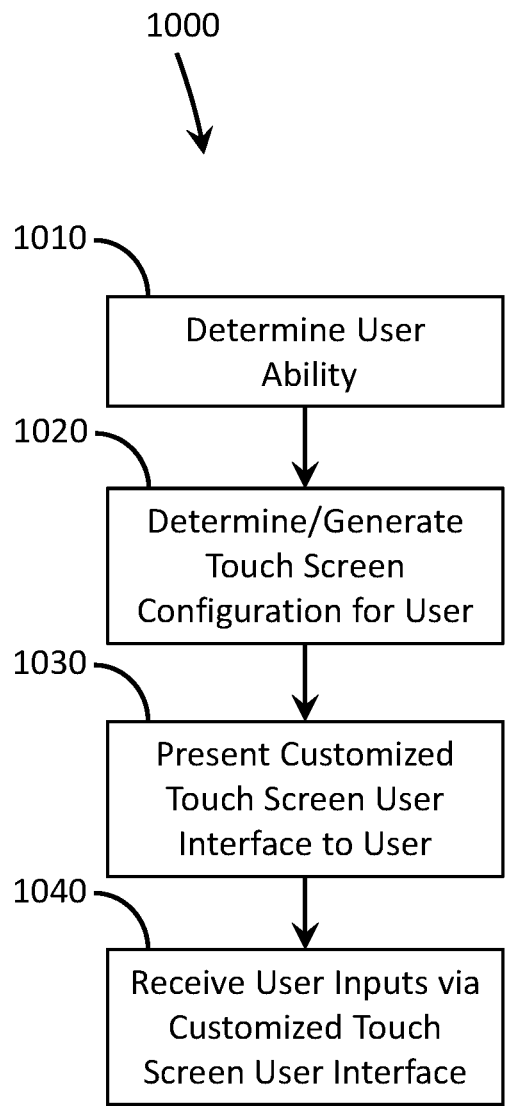
FIG. 10 is a block diagram of an exemplary method for generating and utilizing a customized touch screen configuration.
Figure 11:
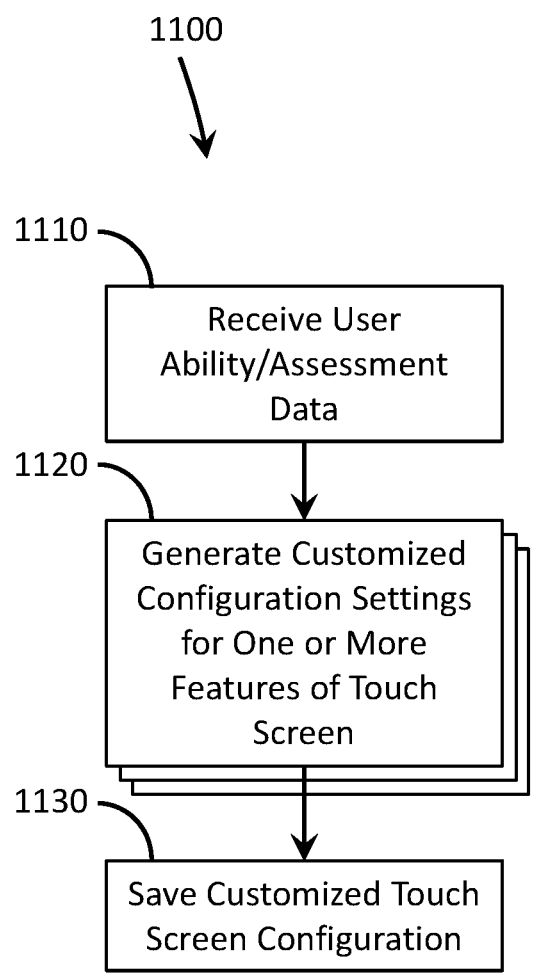
FIG. 11 is a block diagram of an exemplary method for generating a customized touch screen configuration based on a user's abilities.
Figure 12:
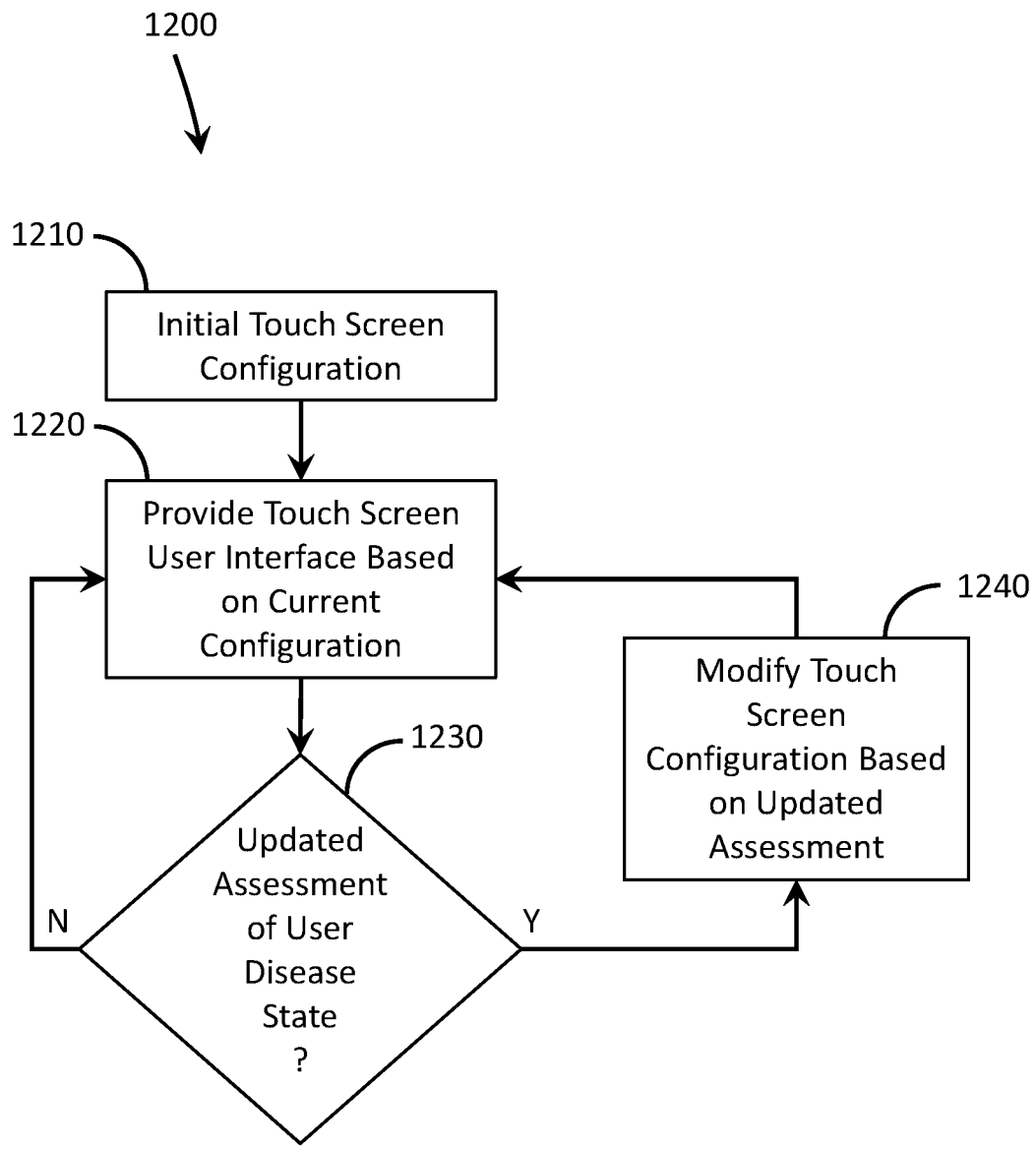
FIG. 12 is a block diagram of an exemplary method for modifying a touch screen configuration based on updated user's abilities.

FIGS. 10-12 are block diagrams of exemplary methodologies associated with the apparatus and systems above. The exemplary methodologies may be carried out in logic, software, hardware, or combinations thereof. In addition, although the methods are presented in an order, the blocks may be performed in different orders. Further, additional steps or fewer steps may be used.

FIG. 10 is a block diagram of an exemplary method 1000 for generating and utilizing a customized touch screen configuration. Method 1000 can be executed using the apparatus and systems mentioned above. First, at step 1010, the method determines the user's ability. (See, e.g., blocks 902-920 shown in FIG. 9.) Then, at step 1020, the method determines/generates a customized touch screen configuration based on the user's abilities. (See, e.g., blocks 930-954 shown in FIG. 9.) At step 1030, the customized touch screen user interface is presented to the user. At step 1040, user inputs are received via the customized touch screen user interface.

FIG. 11 is a block diagram of an exemplary method 1100 for generating a customized touch screen configuration based on a user's abilities. Method 1100 can be executed using the apparatus and systems mentioned above. First, at step 1110, the method receives user ability/assessment data associated with a disease state of the user. Then, at step 1120, the method generates customized configuration settings for one or more features of a touch screen. (See, e.g., blocks 930-954 shown in FIG. 9.) At step 1130, the method saves or stores the customized touch screen configuration.

FIG. 12 is a block diagram of an exemplary method 1200 for modifying a touch screen configuration based on updated user's abilities. Method 1200 can be executed using the apparatus and systems mentioned above. First, at step 1210, the method accesses or utilizes an initial touch screen configuration. Then, at step 1220, the method provides a touch screen user interface to the user based on the current configuration. Then, at step 1230, the method determines if there is an updated assessment of the user's disease state. If there is an updated assessment, then the method proceeds to step 1240, where the touch screen configuration is modified based on the updated assessment (and stored as the current configuration) and provided to the user at step 1220. If there is not an updated assessment at step 1230, then the method returns directly to step 1220 and continues to provide the touch screen user interface with the current configuration.

While the present invention has been illustrated by the description of embodiments thereof and while the embodiments have been described in considerable detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative apparatus and methods, and illustrative examples shown and described. Accordingly, departures may be made from such details without departing from the spirit or scope of the applicant's general inventive concept. While the embodiments discussed herein have been related to the systems and methods discussed above, these embodiments are intended to be exemplary and are not intended to limit the applicability of these embodiments to only those discussions set forth herein. The control systems and methodologies discussed herein may be equally applicable to, and can be utilized in, other systems and methods. Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

We claim:

1. A wheelchair with a disease-based touch screen configuration, comprising:
    a controller configured to control the wheelchair in response to user inputs; and
    a user interface comprising a touch screen for receiving user inputs, wherein the touch screen comprises at least one modifiable feature;
    wherein a configuration of the touch screen user interface comprises a setting for the at least one modifiable feature, and wherein the setting is based on an ability assessment of the user associated with the user's disease state;

wherein the touch screen comprises a boundary for differentiating between a tap input gesture and a swipe input gesture; and wherein a size of the boundary is a modifiable feature of the touch screen and the size setting is based on the ability assessment of the user.

2. The wheelchair of claim 1, wherein the ability assessment of the user comprises a strength and an accuracy determination, and wherein the size setting is based on the strength and the accuracy determinations.

3. A wheelchair with a disease-based touch screen configuration, comprising:
a controller configured to control the wheelchair in response to user inputs; and
a user interface comprising a touch screen for receiving user inputs, wherein the touch screen comprises at least one modifiable feature;
wherein a configuration of the touch screen user interface comprises a setting for the at least one modifiable feature, and wherein the setting is based on an ability assessment of the user associated with the user's disease state;
wherein the touch screen comprises a boundary for differentiating between a tap input gesture and a swipe input gesture; and
wherein a shape of the boundary comprises four sides, and wherein a direction of the swipe input gesture is determined based on which side the swipe input gesture crosses.

4. The wheelchair of claim 3, wherein user touch points are projected along a virtual axis associated with the touch screen.

5. The wheelchair of claim 4, wherein a speed and a direction of a user input gesture is based on the projected user touch points.

6. The wheelchair of claim 1, wherein a pressure sensitivity is a modifiable feature of the touch screen and the pressure sensitivity setting is based on the ability assessment of the user.

7. A wheelchair with a disease-based touch screen configuration, comprising:
a controller configured to control the wheelchair in response to user inputs; and
a user interface comprising a touch screen for receiving user inputs, wherein the touch screen comprises at least one modifiable feature;
wherein a configuration of the touch screen user interface comprises a setting for the at least one modifiable feature, and wherein the setting is based on an ability assessment of the user associated with the user's disease state,
wherein an acceleration threshold of a user input to differentiate between a drag input gesture and a fling input gesture is a modifiable feature of the touch screen and the acceleration threshold setting is based on the ability assessment of the user.

8. The wheelchair of claim 7, wherein the at least one modifiable feature comprises a virtual boundary for differentiating between a tap input gesture and a swipe input gesture, a pressure sensitivity, a color scheme, layout sizing and spacing, an interaction mode, gesture validity criteria, gesture differentiation criteria, a layout complexity, an axis orientation for gesture reference, left or right handedness, and an icon complexity, and wherein the settings for each of the modifiable features are based on the ability assessment of the user.

9. The wheelchair of claim 7, wherein the at least one modifiable feature comprises a plurality of modifiable features and the touch screen configuration comprises the setting for each of the plurality of modifiable features.

10. The wheelchair of claim 9, wherein the touch screen configuration is associated with the user's disease state.

11. The wheelchair of claim 7, wherein the ability assessment of the user is based on a plurality of information sources indicative of the user's disease state.

12. A method of generating a customized touch screen configuration for a user of a wheelchair, comprising:
receiving user ability data associated with the disease state of the user;
determining the user's ability;
generating customized configuration settings for one or more modifiable features of the touch screen user interface;
storing the customized configuration settings as the customized touch screen configuration;
generating the customized touch screen configuration based on the user's ability, wherein the user's ability is associated with a disease state of the user;
presenting a customized touch screen user interface to the user based on the customized touch screen configuration; and
receiving user inputs via the customized touch screen user interface;
wherein the touch screen configuration comprises a virtual boundary for differentiating between a tap input gesture and a swipe input gesture, wherein a size of the virtual boundary is a modifiable feature of the touch screen, and wherein the size setting is generated based on the user ability data.

13. The method of claim 12, wherein the user ability data comprises a strength and an accuracy determination, and wherein the size setting is generated based on the strength and the accuracy determinations.

14. The method of claim 12, wherein the one or more modifiable features comprises a virtual boundary for differentiating between a tap input gesture and a swipe input gesture, a pressure sensitivity, a color scheme, layout sizing and spacing, an interaction mode, gesture validity criteria, gesture differentiation criteria, a layout complexity, an axis orientation for gesture reference, left or right handedness, and an icon complexity, and wherein generating customized configuration settings for each of the modifiable features is based on the user ability data.

15. The method of claim 12, wherein determining the user's ability is based on a plurality of information sources indicative of the user's disease state.

16. The method of claim 12, further comprising:
determining there is an updated assessment of the user's ability; and
modifying the customized touch screen configuration based on the updated assessment.

17. The method of claim 12, wherein determining the user's ability comprises learning the user's responses to requested inputs.

* * * * *